UNITED STATES PATENT OFFICE.

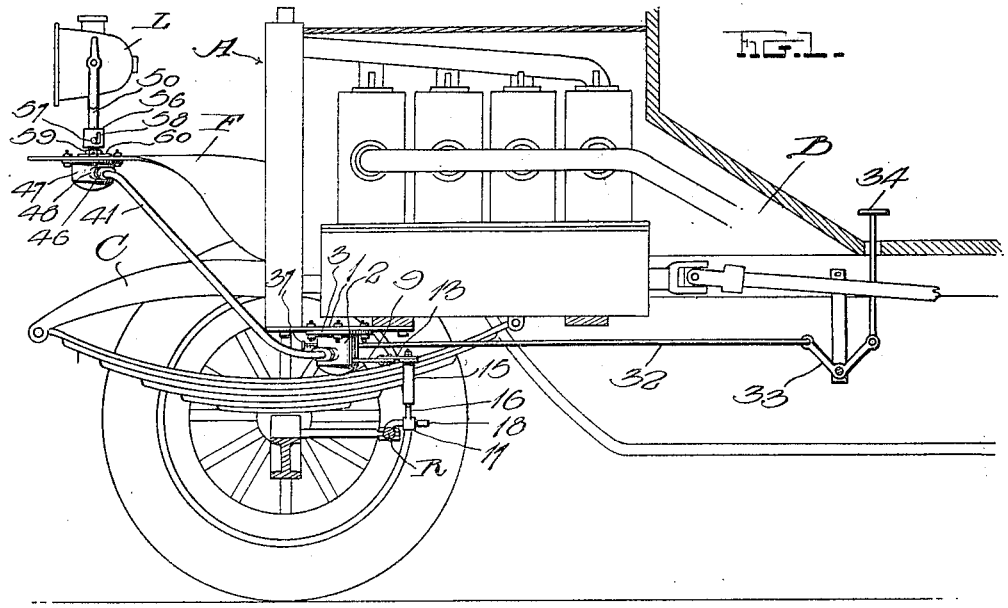

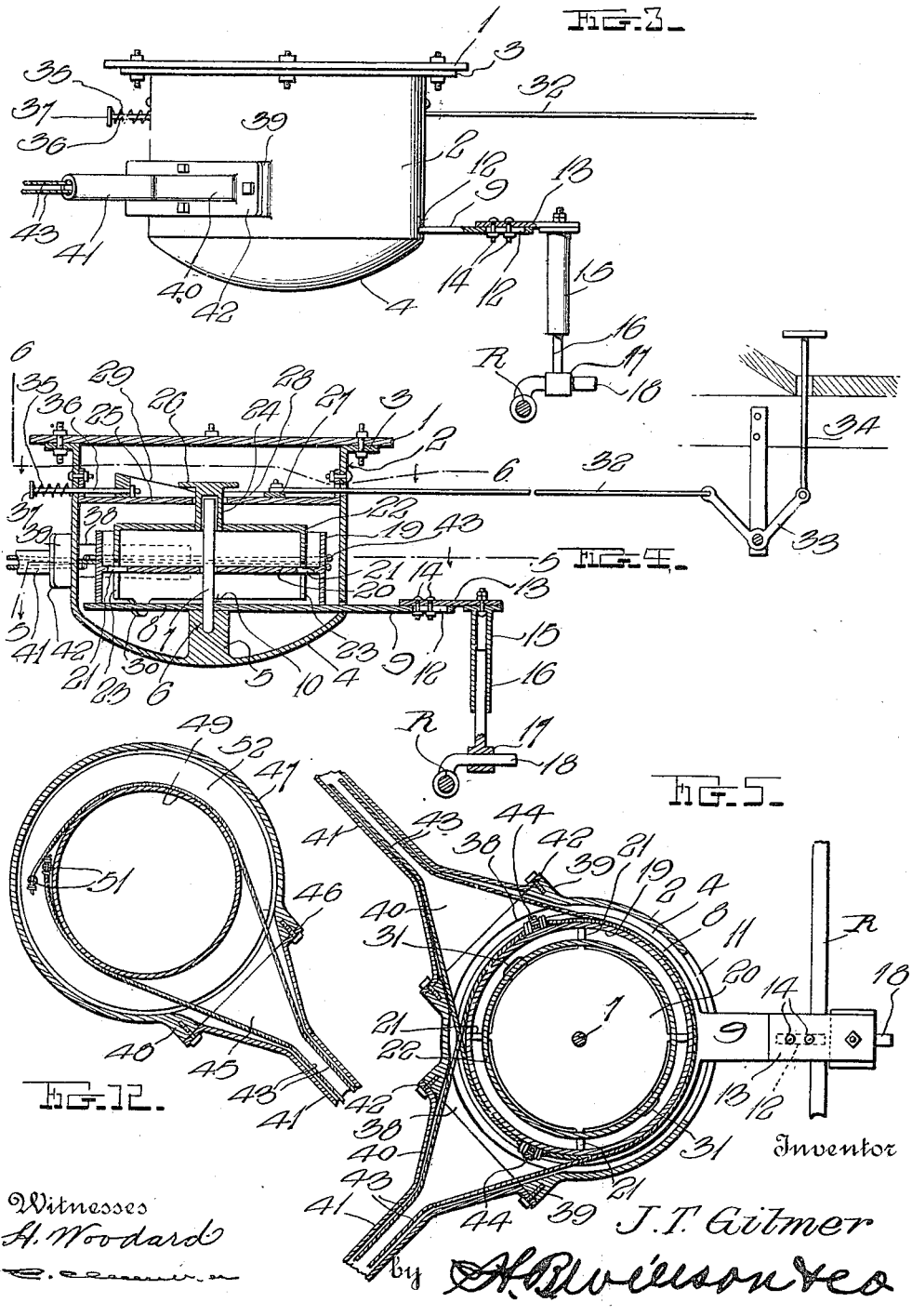

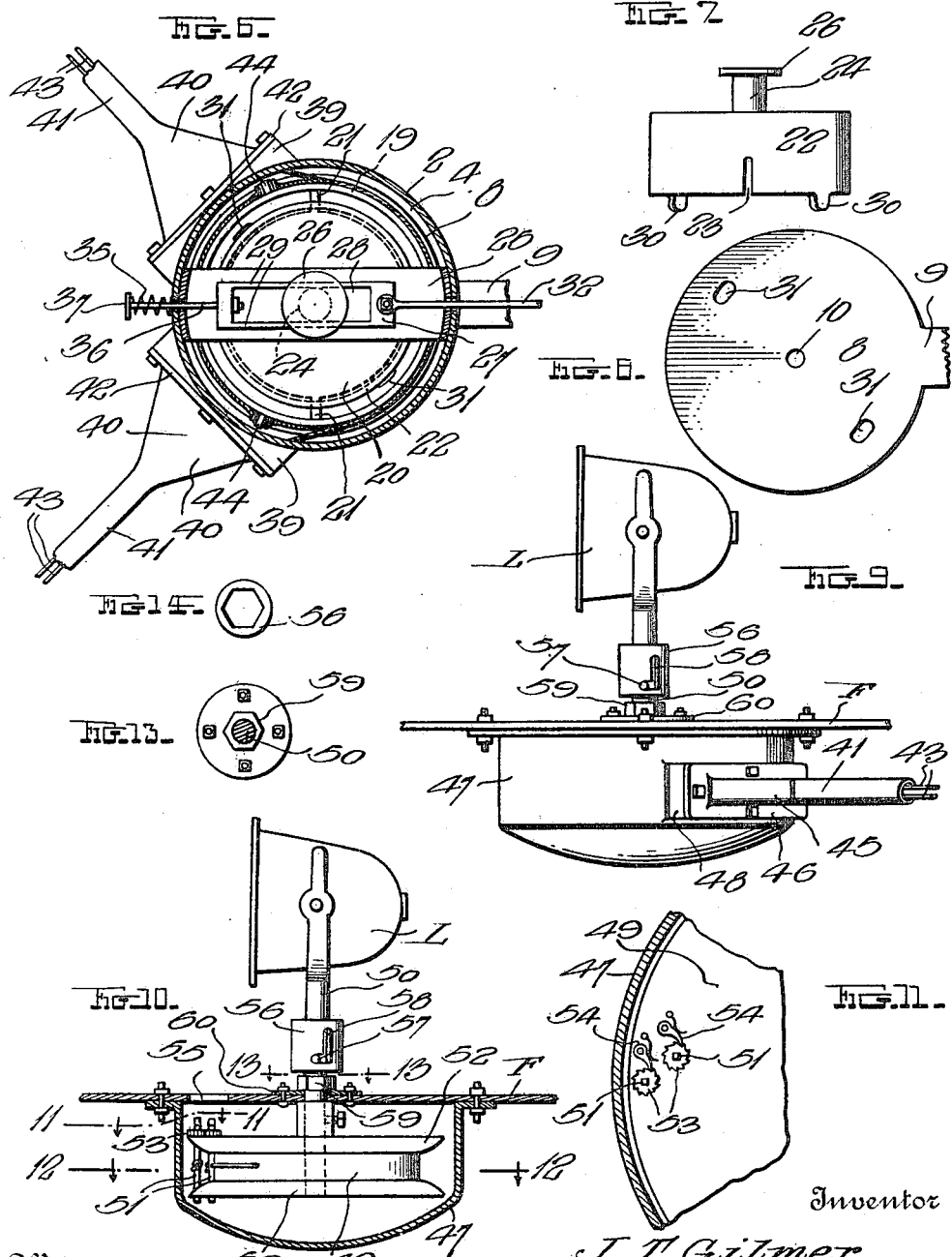

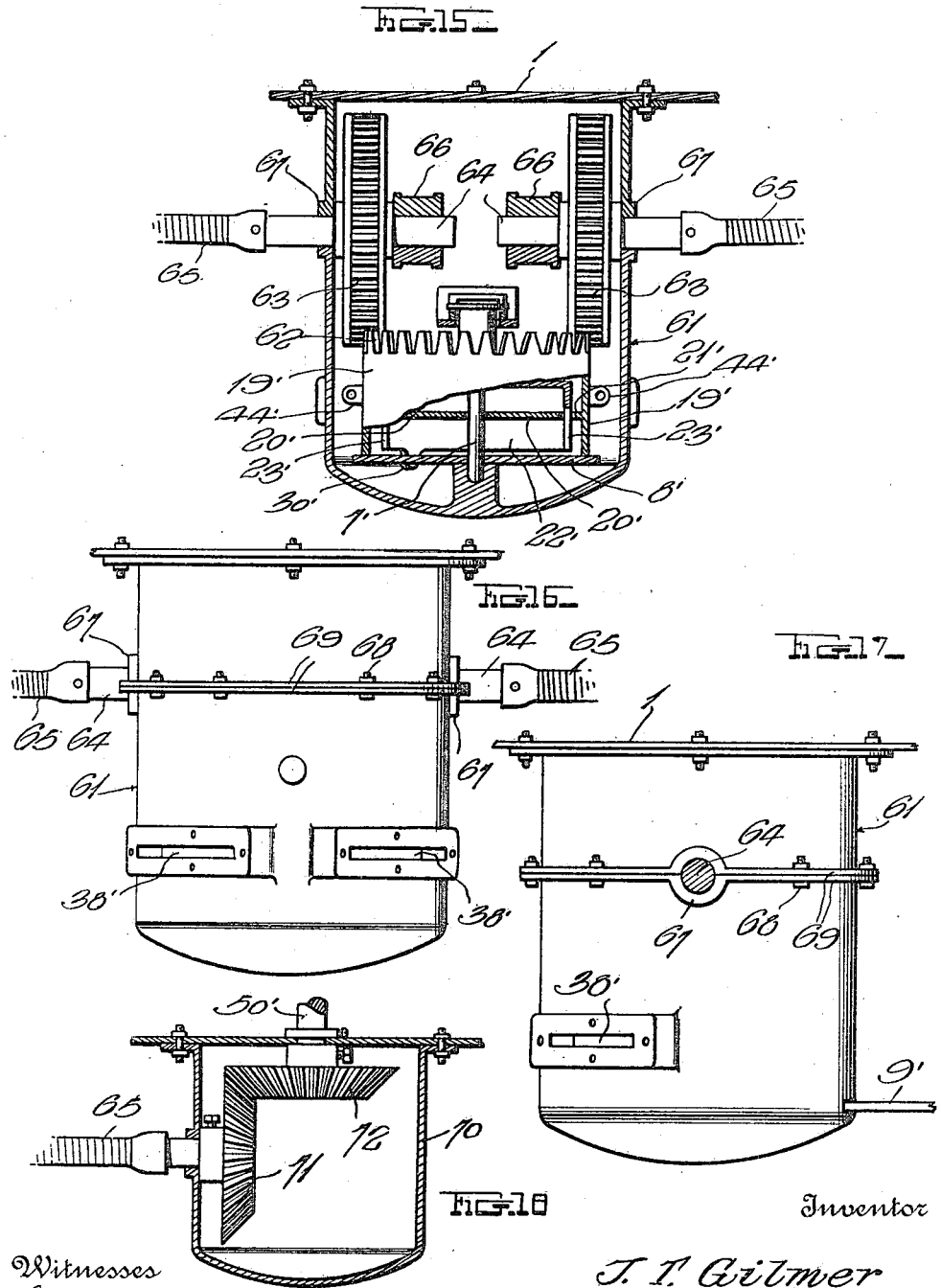

JOHN THORNTON GILMER, OF FULTON, ALABAMA, ASSIGNOR OF ONE-HALF TO SAMUEL EARLE AIRESMAN, OF FULTON, ALABAMA.

DIRIGIBLE HEADLIGHT.

1,204,351.  Specification of Letters Patent.  Patented Nov. 7, 1916.

Application filed March 2, 1916. Serial No. 81,750.

*To all whom it may concern:*

Be it known that I, JOHN T. GILMER, a citizen of the United States, residing at Fulton, in the county of Clarke and State of Alabama, have invented certain new and useful Improvements in Dirigible Headlights; and I do declare the following to be a full, clear, and exact description of the invention, such as will enable others skilled in the art to which it appertains to make and use the same.

This invention relates to improvements in vehicle headlights particularly those of the dirigible type to be used on automobiles.

The principal object of my invention is to provide a device of this character by which the lamps may be automatically turned in the direction of movement of the automobile when the steering mechanism is operated.

An additional object is to provide means whereby the lamps may be disconnected so that they will not be turned when the steering mechanism is operated.

Still another object is to provide a simply constructed apparatus of this character which, with very slight changes can be applied to any automobile.

With the above and many other objects in view, my invention resides in the novel features of construction, combination and arrangement of parts which will hereinafter be more particularly described and claimed.

In the accompanying drawings: Figure 1 represents a longitudinal section through the front end of an automobile showing one method of attaching my improved light controlling apparatus thereto; Fig. 2 is a bottom plan view of the front end of an automobile showing more particularly the arrangement of the several parts of the device; Fig. 3 is a side elevation of the lamp controlling means removed from the vehicle; Fig. 4 is a central vertical longitudinal section of the parts shown in Fig. 3; Fig. 5 is a horizontal section on the line 5—5 of Fig. 4; Fig. 6 is a similar view on the line 6—6 of Fig. 4; Fig. 7 is a detail side elevation of one of the interior parts of these controlling means; Fig. 8 is a plan view of still another part; Fig. 9 is a side elevation of one of the lamps with its operating means; Fig. 10 is a central vertical section through the parts shown in Fig. 9; Fig. 11 is an enlarged fragmentary view on the line 11—11 of Fig. 10; Fig. 12 is a horizontal section on the line 12—12 of Fig. 10; Fig. 13 is a similar view on the line 13—13 of Fig. 10, showing one portion of the lamp locking means in plan view; Fig. 14 is a plan view of the coöperating locking means; Fig. 15 is a vertical longitudinal section showing a slightly different form of controlling means which may be used in connection with the lamps; Fig. 16 is a side elevation of the modified form shown in Fig. 15; Fig. 17 is a similar view, parts being viewed at right angles to that shown in Fig. 16; Fig. 18 is a vertical section of the lamp operating means used in connection with this improved controlling means.

As shown in the drawings my invention is designed to be attached to the body B or the chassis C of any type of automobile A. The casing containing the controlling means is attached to the under side of the body B, preferably to the plate 1, the lamps L being mounted upon the fenders F. These lamps have the operating means connected directly therewith which in turn is connected to the controlling means beneath the body of the vehicle, said controlling means being attached to the steering mechanism so that when the front wheels of the automobile A are turned the lamps L will be turned in the same direction so as to throw their rays of light in the direction of travel.

While I have shown the lamps L as mounted upon the fenders it is obvious that with very little changes it could be attached to any other part of the vehicle and still operate in the same manner.

In one form of the invention the controlling means is housed in a casing 2 preferably cylindrical in shape and provided with an annular attaching flange 3 at one end by which the same may be secured to the plate 1 or other part of the vehicle, the other end of the casing being closed by the bottom 4. From the center of the bottom 4 a boss 5 projects upwardly and has a socket 6 in its top in which a shaft 7 is disposed, the top of said boss also supporting a preferably circular plate 8 from which an arm 9 extends. This plate has a central aperture 10 to receive said shaft 7 so that it may rotate thereon, the arm 9 extending through a slot 11 in the upright wall of the casing 2 and provided with a slot 12 in its outer end. A plate 13 is preferably attached to the arm 9 by means of the bolts 14 which are disposed in said slot 12, thus providing means whereby said arm may be lengthened if necessary. The outer end of the plate 13 which forms a portion of the extensible arm is provided with a depending cylinder 15 in which slides a rod 16. The lower end of this rod has a sleeve 17 formed integrally therewith in which a finger 18 carried by the steering rod R of the steering mechanism is disposed. From this description it will be seen that when the rod R is shifted in either direction the finger 18 will cause the rod 16 to move the arm 9 in the same direction and rotate the plate 8 around the shaft 7. By providing the sliding connection between the rod R and the arm 9, the passage of the vehicle over rough roads will not jar the parts to such an extent that they will become disengaged and prevent operation of the headlights.

The plate 8 as shown in the drawings is disposed in a horizontal plane and has a drum 19, open at both ends, disposed thereon and movable independently thereof. This drum 19 has a disk 20 spaced from its inner wall and secured thereto by means of the rods 21, said disk also having an opening through its center to receive the shaft 7. Between the edge of the disk 20 and the wall of the drum 19 a cylinder 22 is placed, said cylinder having a number of notches 23 communicating with its lower edge for the reception of the rods 21. In this manner the cylinder 22 is slidably connected to the drum 19 and will rotate therewith as long as the rods 21 are disposed in said notches 23. The top of the cylinder 22 has an opening to receive the upper end of the shaft 7, surrounding which is a hollow stem 24 which projects through an opening in a plate 25 which has a head 26 on its upper end. The head 26 is spaced above the plate 25 to receive a cam carrying member 27 which is slotted as shown at 28 and surrounds the stem 24. One end of the member 27 is provided with cam faces 29 so that when the same is moved in one direction the faces will contact with the head 26 and raise the cylinder 22 to disengage the lugs 30 carried by the lower edge thereof from slots 31 in the plate 8. When these lugs engage the slots it is obvious that the cylinder 22 and drum 19 will rotate with the plate 8 when it is moved by the operation of the steering rod R of the steering mechanism, but when said lugs are raised out of engagement the plate 8 may be rotated without movement of the drum or cylinder.

I operate the cam carrying member by any preferred means, that shown consisting of a rod 32 secured to one end thereof which extends rearwardly beneath the bottom of the vehicle to a point below the foot board of the body where it is connected to a bell crank 33 which in turn is connected with a foot pedal 34 which can be operated by the driver's foot. When this foot pedal is depressed the cam carrying member will be moved sufficiently to raise the cylinder out of the slots in the plate 8, and when it is released the tension of a spring 35 will force said member in the opposite direction to allow the lugs to engage their respective slots. This spring 35 is disposed around a rod 36 which extends from the member 27 and through an opening in the wall of the casing 2, its opposite ends contacting with said wall and with the head 37 carried by said rod. This arrangement will allow the headlights to normally turn in the direction of travel of the vehicle, while permitting the operator at his will to disengage the parts and allow said lights to remain stationary.

It is obvious that the means for operating the headlights L extends thereto from the drum 19. The specific construction of this connection is now about to be described.

The casing 2 is slotted on opposite sides as shown at 38, the portion of the casing immediately surrounding these slots being strengthened as shown at 39 so that the flared ends 40 of conduits 41 may be readily attached thereto. These flared ends are preferably rectangular in cross section and of a width substantially the same as the conduits 41, and their edges are provided with attaching flanges 42 by which they may be attached to the enlarged portions 39. As shown particularly in Fig. 5 the conduits 41 receive the cables 43, one pair thereof running to each of the headlights L, the ends of the cables being wound around the drums 19 and connected thereto. The pair of cables from each of the conduits is extended to the drum in opposite directions and attached to the ears 44. The opposite ends of the conduits 41 are also flared as shown at 45 and provided with attaching flanges 46 in the same manner as the other ends. Each of the flared portions 45 is attached to one of the casings 47 which contains the lamp operating means, said casings being slotted to allow the entrance of the cables 43 and are provided around these slots with strengthened portions 48 similar to the casing 2. Since each of the casings 47 and the mechanism contained therein are alike only one will be described for the sake of convenience. The ends of the cables after being extended into the casing 47 are wound around a spool 49 which is fixed to the lower end of a lamp shaft 50 which extends through the fender F or other support. The free ends of these cables are secured to the spool so that they will rotate therewith, the means for accomplishing this being a pair of shafts 51 rotatably mounted in the flanges 52 of the spool 49, said ends being passed through openings in said shafts 51 and knotted. The upper ends of these shafts have ratchet gears 53 fixed thereto with which spring pressed pawls 54 coact to prevent retrograde movement thereof. The upper ends of the shafts are squared to receive a key whereby the same may be turned to wind the cables therearound to adjust the length of the same to facilitate the rotation of the lamp. The fender or other support to which the lamp and the casing 47 are attached is preferably provided with an opening 55 directly over the ends of the shafts 51 to allow the insertion of a key for turning the same.

When the operator of the vehicle has depressed the foot pedal 34 so as to disengage the lugs 30 from the slots 31 to prevent the lamps being rotated when the steering mechanism is operated, and held in this position, said lamps will have a tendency to wabble around unless locked. I have provided a very simple means for preventing this, which comprises sleeves 56, one of which is disposed on each lamp shaft 50 and is connected thereto by means of pins 57 which are disposed in the bayonet slots 58. The interior surfaces of these sleeves 56 are of angular formation and are adapted, when it is desired to hold the lamps stationary, to be disposed around the angular collars 59 which surround the shafts 50 and are secured to the fenders F or other supports by the attaching flange 60. When the sleeves 56 engage these collars the pins 57 will be in the vertical portion of the bayonet slots, thus holding the lamps rigidly on the supports or fenders. When the lamps are to be operated by the steering mechanism the sleeves 56 are raised from the collars 59 and rotated slightly to dispose the pins 57 in the horizontal portions of the bayonet slots.

As shown in Figs. 15 to 18 the elements hereinbefore described may be changed slightly so as to produce a somewhat different apparatus for accomplishing the same results. In this modified form the controlling means is contained in a two-part casing 61 which is secured as the casing 2 by attaching flanges to the plate 1 or other part of the under side of the vehicle body. In this form also a circular plate 8' is rotatably mounted on the shaft 7' and has slots therein to receive lugs 30' carried by a cylinder 22'. This plate 8' is provided with an extensible arm 9' connected in the same manner to the steering rod R of the vehicle. The cylinder 22' is slotted as shown at 23' to receive the rods 21' by which the disk 20' is secured to the drum 19'. The means for raising the lugs 30' from the slots in the plate 8' is also the same as that illustrated in the form hereinbefore described. This modified form, however, differs in the means for transmitting the movement of the drum 19' to the lamps L. In this case the upper edge of the drum 19' is provided with gear teeth 62 which mesh with any preferred form of gear wheels 63 fixed to the solid shafts 64 on the ends of flexible shafts 65. The shafts 64 are rotatably mounted in bearings 66 and 67 carried by the two-part casing 61, which is connected by bolts 68 which pass through flanges 69 on the meeting edges of said parts. The flexible elements 65 extend from the casing 61 to the casings 70 which house the lamp operating means, the ends of said shafts extending through openings therein as shown in Fig. 18. A bevel gear 71 is secured to the end of each shaft 65 within the casing 70, which meshes with an additional bevel gear 72 secured to one end of the lamp shaft 50'. These lamp shafts 50' are rotatably mounted in the fenders F or other supports, and may be locked in stationary position by the same means employed in connection with the form hereinbefore described, when the operator of the vehicle does not care to have the lamps turned in the direction of travel. The structure shown in the illustrations of this modified form may also be used with cables if it is so desired or if the flexible shafts get out of order. For this purpose the drum 19' is provided with attaching ears 44' for securing the ends of the cables thereto, and these cables may extend through slots 38' in the sides of the casing 61.

From the foregoing description of the construction and operation of my invention, it will be seen that I have invented a simple and inexpensive apparatus by which the headlights of an automobile or other vehicle may be caused to turn in the direction of travel thereof to throw the rays of light so that the driver can determine where his machine is running. In addition to the structure for carrying out this object it will be noticed that I have also devised means whereby the lamps may be held in a stationary position when it is not desired to have them turn with the movement of the front wheels of the vehicle.

I claim as my invention:

1. The combination with a vehicle having a lamp pivotally mounted thereon, of a plate having an arm extending therefrom, said arm being connected with the steering mechanism, a drum movable on said plate, a connection between said drum and lamp, means for connecting said drum and plate, whereby when said plate is moved by the steering mechanism the lamp will be turned, and means for disengaging said drum from the plate to allow said lamp to remain stationary.

2. The combination with a vehicle having a lamp pivotally mounted thereon, of a plate having an extensible arm formed thereon, a sliding connection between said arm and steering mechanism, a drum movable on said plate, a connection between said drum and lamp, and means for connecting said drum and plate, whereby when said plate is moved by the steering mechanism the lamp will be turned.

3. The combination with a vehicle having a lamp pivotally mounted thereon, of a plate having an extensible arm formed thereon, a cylinder secured thereto, a rod slidable therein, a finger on the vehicle steering rod and having said first mentioned rod connected thereto, a drum movable on said plate, a connection between said drum and lamp, and means for connecting said drum and plate, whereby when said plate is moved by the steering mechanism the lamp will be turned.

4. The combination with a vehicle having a lamp pivotally mounted thereon, of a plate having an arm extending therefrom, said arm being connected with the steering mechanism, a drum movable on said plate, a cylinder in said drum and connected thereto, means for connecting said cylinder to the plate, a connection between said drum and lamp, whereby when said plate is moved by the steering mechanism, the lamp will be turned, and means for disengaging said plate and cylinder to allow said lamp to remain stationary.

5. In a device of the class described, a drum connected with a lamp, a plate attached to the steering mechanism of a vehicle and movable therewith, means for engaging said plate and drum to rotate the lamp when the steering mechanism is operated, and means for disengaging said plate and drum to prevent the lamp from being rotated.

6. In a device of the class described, a drum to be connected with a lamp, a plate having an extensible arm thereon, a sliding connection between said arm and the steering mechanism of a vehicle whereby the plate is moved therewith, means for engaging said plate and drum to rotate the lamp when the steering mechanism is operated, and means for disengaging said drum from the plate to prevent rotation of said lamp.

7. In a device of the class described, a drum, a plate attached to the steering mechanism of a vehicle and movable therewith, a cylinder within said drum and connected therewith, means for connecting said cylinder and plate, and means for raising said cylinder out of engagement with said plate.

8. In a device of the class described, a drum, a plate attached to the steering mechanism of a vehicle and movable therewith, a cylinder within said drum and connected thereto, means for connecting said cylinder and plate, a stem rising from said cylinder, a head thereon, a cam for coaction with said head to raise said cylinder out of engagement with said plate, and means for holding said cam in retracted position.

9. In a device of the class described, a drum, a plate attached to the steering mechanism of a vehicle and movable therewith, said plate having a slot therein, a cylinder within said drum and slidably connected therewith, a lug on said cylinder normally engaging said slot whereby said article will be rotated when the steering mechanism is operated, and means for raising said cylinder and its lug out of engagement with said plate.

10. In a device of the class described, a drum, a disk in said drum and spaced from the wall thereof, rods connecting the edges of said disk with said drum, a cylinder disposed between the wall of said drum and the edges of said disk and having notches therein to receive said rods, a lug carried by said cylinder, a plate attached to the steering mechanism of a vehicle and movable therewith, said plate having a slot therein normally receiving said lug, and means for raising said cylinder and its lug out of engagement with said plate.

11. In a device of the class described, a drum, a disk in said drum and spaced from the wall thereof, rods connecting the edges of said disk with said drum, a cylinder disposed between the wall of said drum and the edges of said disk and having notches therein to receive said rods, a lug on said cylinder, a plate attached to the steering mechanism of a vehicle and movable therewith, said plate having a slot therein normally receiving said lug, a stem rising from said cylinder, a head thereon, and a cam for coaction with said head to raise said cylinder out of engagement with said plate.

12. In a device of the class described, a support, a shaft rising therefrom, a plate rotatable on said shaft and attached to the steering mechanism of the vehicle, said plate having a slot therein, a drum, a disk in said drum and spaced from the wall thereof, said disk having an opening in its center to receive said shaft, rods connecting the edges of said disk with said drum, a cylinder disposed between the walls of said drum and the edges of said disk and having notches therein to receive said rods, a lug on said cylinder to normally engage said slot, a hollow stem rising from the top of said cylinder and receiving said shaft, a head on said stem, and means for coacting with the head for raising said cylinder out of engagement with said slot.

13. In a device of the class described, a lamp shaft having a lamp on one end, a spool on the opposite end, a drum, means connected with the drum to operate the same when the steering mechanism is moved, a connection between said spool and drum, whereby movement of said drum will operate the spool to rotate the lamp, and means for disengaging said drum from its operating means to prevent rotation of the lamp.

14. In a device of the class described, a lamp shaft having a lamp on one end, a spool on the opposite end, a drum, means connected with the drum to operate the same when the steering mechanism is moved, a connection between said spool and drum, whereby movement of said drum will operate the spool to rotate the lamp, means for disengaging said drum from its operating means, and means for holding said lamp stationary when the last mentioned means is in operation.

15. In a device of the class described, a lamp shaft having a lamp on one end, a spool on the opposite end, a shaft rotatably mounted in the flanges in said spool, a ratchet gear on the end of said shaft, a pawl to prevent retrograde movement of said shaft, a drum, means connected with the drum to operate the same when the vehicle steering mechanism is moved, a flexible connection between said drum and spool, one end being attached to said last mentioned shaft whereby the same may be adjusted, and means for disengaging said drum from its operating means.

16. In a device of the class described, a support, a lamp shaft rotatably mounted therein, a lamp on said shaft, means for rotating said shaft to turn the lamp, a slotted sleeve on said shaft, the interior of said sleeve being angular, a pin carried by the shaft and disposed in said slot, an angular collar secured to the support and surrounding said shaft, said sleeve being adapted to be disposed around said collar to prevent rotation of the shaft.

In testimony whereof I have hereunto set my hand in presence of two subscribing witnesses.

JOHN THORNTON GILMER.

Witnesses:
A. L. MANES,
R. H. HARRIGAN.

Copies of this patent may be obtained for five cents each, by addressing the "Commissioner of Patents, Washington, D. C."